United States Patent [19]
Kobayashi

[11] Patent Number: 4,954,120
[45] Date of Patent: Sep. 4, 1990

[54] SLIDABLE CONSTANT VELOCITY JOINT

[75] Inventor: Katsuyuki Kobayashi, Aichi, Japan

[73] Assignee: Toyota Jidosha Kabushiki Kaisha, Japan

[21] Appl. No.: 299,066

[22] Filed: Jan. 19, 1989

[30] Foreign Application Priority Data

Jan. 25, 1988 [JP] Japan ............................ 63-12485
Feb. 12, 1988 [JP] Japan ............................ 63-28880

[51] Int. Cl.⁵ .............................................. F16D 3/221
[52] U.S. Cl. ................................... 464/141; 464/167; 464/906
[58] Field of Search ............... 464/111, 120, 123, 139, 464/141, 147, 150, 152, 167, 904, 905, 906

[56] References Cited

U.S. PATENT DOCUMENTS

| 1,966,486 | 7/1934 | Cutting . | |
|---|---|---|---|
| 2,060,473 | 11/1936 | Schumb . | |
| 2,910,845 | 11/1959 | Wahlmark | 464/141 |
| 3,362,190 | 1/1968 | Bretschneider et al. | 464/139 |
| 3,381,497 | 5/1968 | Allen . | |
| 3,400,557 | 9/1968 | Westercamp | 464/906 X |
| 4,156,354 | 5/1979 | Krude | 464/141 |

FOREIGN PATENT DOCUMENTS

| 2355766 | 1/1975 | Fed. Rep. of Germany . | |
|---|---|---|---|
| 2517967 | 5/1976 | Fed. Rep. of Germany . | |
| 2191656 | 7/1973 | France . | |
| 131832 | 10/1981 | Japan | 464/139 |
| 720228 | 3/1980 | U.S.S.R. | 464/139 |
| 24837 | 4/1915 | United Kingdom . | |
| 775618 | 5/1957 | United Kingdom | 464/141 |
| 1157244 | 7/1969 | United Kingdom . | |
| 2099551 | 12/1982 | United Kingdom . | |
| 2131519 | 6/1984 | United Kingdom | 464/141 |

OTHER PUBLICATIONS

Japanese U.M. Public Disclosure (KOKAI) No. 61-114128, 7/86.
Japanese U.M. Public Disclosure (KOKAI) No. 62-20225, 2/87.
Japanese Patent Public Disclosure (KOKAI) No. 61-189322, 8/86.
Japanese Patent Public Disclosure (KOKAI) No. 61-252920, 11/86.

Primary Examiner—Daniel P. Stodola
Attorney, Agent, or Firm—Oliff & Berridge

[57] ABSTRACT

A universal joint includes an inside part provided integrally with a first shaft and having three first holding portions disposed spacedly apart circumferentially at equal intervals, an outside part provided integrally with a second shaft and having three second holding portions, each second holding portion having a recess extending axially to receive the first holding portion and a rolling body disposed in each recess so as to be in contact with the first and second holding portions. One of the first and second holding portions in contact with the rolling body has a concave surface while the other of the first and second holding portions in contact with the rolling body has a plane.

7 Claims, 4 Drawing Sheets

SLIDABLE CONSTANT VELOCITY JOINT

BACKGROUND OF THE INVENTION

1. Field of the Invention

This invention relates to a universal joint and, more particularly, to a universal joint suitable to use in a drive line of a vehicle.

2. Description of the Prior Art

One of the universal joints used in a drive line of a vehicle, is a so-called tripod type constant velocity universal joint, which comprises an inside part provided integrally with a first shaft and having three trunnions which are spaced apart circumferentially at equal intervals, an outside part disposed so as to surround the inside part, provided integrally with a second shaft and having three axially extending guide grooves which are spaced apart circumferentially at equal intervals and a roller rotatably supported by each of the trunnions to slide in one of the guide grooves. A portion of each guide groove in contact with each roller has an arcuate-shape in section and, on the other hand, each roller has an outer peripheral surface formed into a spherical surface.

When the constant velocity universal joint is incorporated in the drive line of a vehicle for use, the first and second shafts define an angle, so that the constant velocity universal joint is rotated with a so-called joint angle condition. In this case, each of the rollers will be moved relatively in an axial direction of the outside part and simultaneously in a radial direction thereof along with the rotation of the shafts. During rotation, vibrations are generated due to frictional resistance in the above relative movements to give an uncomfortable feeling to passengers.

There are various proposals to avoid the vibrations as noted above.

Japanese Utility Model Public Disclosure (KOKAI) No. 62-20225 has disclosed a universal joint, in which a portion of each guide groove of an outside part in contact with a roller has a linear shape in section, whereas the roller is formed cylindrically. A guide ring is disposed inside the roller and the roller is supported through the guide ring by a trunnion. Each of the trunnions is formed to have a spherical surface convexly extending to the guide ring which is formed to have a spherical surface convexly extending to the trunnion, and these parts are in contact with each other through respective spherical surfaces.

Japanese Patent Public Disclosure (KOKAI) No. 61-189322 discloses another universal joint, in which a portion of each guide groove of an outside part located radially outward of a roller is formed to have a linear shape in section and a roller is formed cylindrically. Between the guide groove and the roller is interposed a part U-shaped as viewed in plan, and formed to have an arcuate outer peripheral surface in section and a linear inner peripheral surface in section.

A further universal joint is disclosed in the Japanese Utility Model Public Disclosure (KOKAI) No. 61-114128, in which a plurality of needles for rotating a roller circumferentially are disposed between the roller and a trunnion and further a plurality of other needles for moving the roller axially of the trunnion are disposed inside the aforementioned needles.

SUMMARY OF THE INVENTION

In all of the universal joints disclosed in the above three Disclosures, the number of parts is increased and the configurations of the joints are complicated. Further, since parts newly added to constitute creative universal joints need precise working, the working is laborious and causes high cost.

An object of the present invention is to provide a universal joint which simplifies the structure to avoid high cost without increasing the number of parts.

The universal joint according to the present invention comprises an inside part provided integrally with a first shaft and having three first holding portions disposed spacedly apart circumferentially at equal intervals and extending radially, an outside part provided integrally with a second shaft and having three second holding portions disposed spacedly apart circumferentially at equal intervals and having respectively recesses extending axially of the second shaft to receive the respective holding portions, and at least a rolling body disposed in each of the recesses to come into contact respectively with the first holding portion of the inside part and the second holding portion of the outside part, wherein one of the first and second holding portions in contact with the rolling body includes a concave surface while the other of the first and second holding portions in contact with the rolling body includes a plane.

When a single rolling body is disposed in each of the recesses so as to come into contact with the first and second holding portions, the surface of the first holding portion in contact with the rolling body constitutes a concave surface. The rolling body is held on the concave surface and has such a size to project portions of the rolling body to both sides thereof from the first holding portion, and the second holding portioned has two planes in contact with the rolling body.

When two rolling bodies are disposed in the respective recesses so as to come into contact with the first and second holding portions, one rolling body is disposed at each side of the first holding portion. The surface of the first holding portion in contact with each rolling body is a plane and the second holding portion has two concave surfaces each in contact with each rolling body.

The inside part is preferably formed of three members disposed circumferentially and having the same configuration. Each of the three members has a holding piece provided at each of circumferential ends and each of the holding pieces is attached fixedly to another holding piece of an adjacent member to constitute the first holding portion. In this case, the holding portion of the outside part has a recess defined by two planes to receive the first holding portion. The rolling body is sandwiched by the holding pieces of two adjacently arranged members of three members of the inside part and the members are secured fixedly to each other. Thus, the rolling bodies are attached to the inside part. The inside part is incorporated in the outside part to complete a universal joint.

The concave surface is formed into a concave elliptical surface, parabolic surface, conical surface or polygonal surface other than a concave spherical surface, and, on the other hand, the rolling body is formed to have a circular profile having a uniform diameter in the equator portion of a sphere other than a sphere.

For example, the first shaft is connected to a drive side and the second shaft is connected to a driven side for use. A drive force or rotary torque transmitted from the first shaft is transmitted through the inside part to the rolling bodies and further transmitted from the rolling bodies to the outside part to be taken out by the second shaft.

When the universal joint is rotated with a joint angle, the rolling bodies roll on a plane and the rolling bodies and first or second holding portion are moved relatively to each other axially and radially. Thus, the frictional resistance in the relative movements is reduced greatly. Then the universal joint is subjected to the same constant velocity principle as a prior constant velocity universal joint for constant velocity rotation.

Since the rolling body is constituted to be held in position by the concave surface provided on one of the first holding portion of the inside part and the second holding portion of the outside part to thereby be rolled on the plane provided on the other, the number of parts may be reduced greatly compared with the universal joints disclosed in the above-mentioned Disclosures and the structure of the universal joint is simplified, so that cost reduction may be accomplished.

Since the rolling bodies roll on the plane when the universal joint is rotated with a joint angle, the relative movements of the rolling bodies to the first or second holding portion will be carried out under a low frictional condition. Thus, the vibrations caused by the rotation under the presence of the joint angle may be greatly reduced.

When the inside part is formed of three members, the rolling body is held by bringing the holding pieces of the adjacent members into intimate contact with each other to fix the members, so that the working of the concave surface of the inside part is facilitated.

BRIEF DESCRIPTION OF THE DRAWINGS

The foregoing and other object and features of the invention will become apparent from the following description of preferred embodiments of the invention with reference to the accompanying drawings, in which.

DETAILED DESCRIPTION OF PREFERRED EMBODIMENTS

Figure 1:
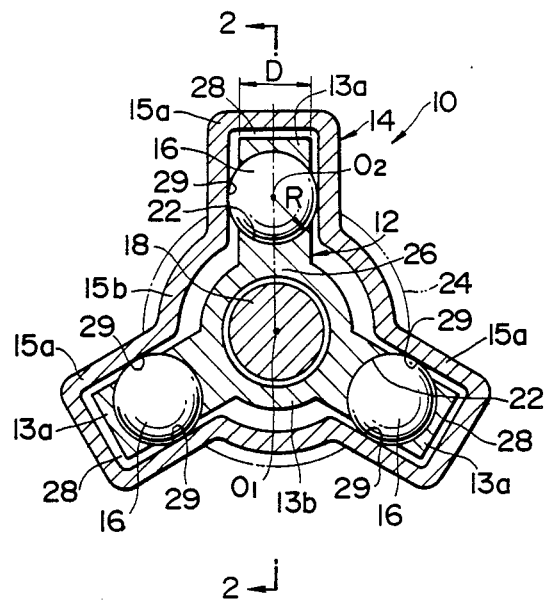
FIG. 1 is a sectional view taken along a plane orthogonal to an axis of a universal joint.
Figure 2:
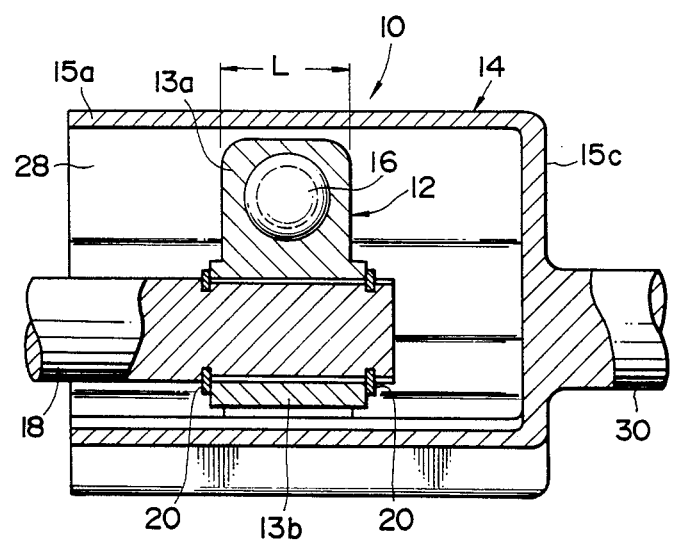
FIG. 2 is a sectional view taken along the line 2—2 in FIG. 1.

A universal joint 10 comprises an inside part 12, an outside part 14 and rolling bodies 16 as shown in FIGS. 1 and 2.

The inside part 12 has three holding portions 13a arranged spacedly apart circumferentially at equal intervals of 120° from each other and extending radially. In the embodiment shown, the three holding portions 13a are united integrally with a central cylindrical boss 13b. The boss 13b is provided on an inner peripheral surface with a spline and, on the other hand, a shaft 18 having a spline on an outer peripheral surface is fitted in the boss 13b. The boss 13b is fixed by a snap ring 20 and the inside part 12 is coupled with the shaft 18.

Each holding portion 13a has a substantially rectangular parallelopiped shape and is formed to have an axial length L of the shaft 18 larger than a thickness D in a direction orthogonal to the axis. The length L is set to be larger than a diameter of the rolling body 16 which will be later described and the thickness D is set to be smaller than the diameter of the rolling body 16.

Each holding portion 13a is provided with a concave surface 22. In the embodiment shown, the concave surface 22 corresponds to a concave spherical surface having a radius R centering around the intersection point $O_2$ of a circle 24 centering around the axis $O_1$ of the shaft 18 and drawn on an imaginary plane orthogonal to the axis and a radius 26 extending from the axis $O_1$ to the center of the holding portion 13a.

The outside part 14 surrounding the inside part 12 is provided at circumferentially equal intervals of 120° with three second holding portions 15a having respective recesses 28 for receiving the respective holding portions 13a of the inside part 12. Each holding portion 15a of the outside part 14 is configured to project radially outward from a base 15b. One axial end of the holding portion 15a and base 15b is closed by a closure 15c and the other end thereof is open. A shaft 30 is coupled integrally with the closure 15c. The inside part 12 is inserted into the interior of the outside part 14 from an opening of the outside part 14.

The recess 28 has on both sides two planes 29 parallel to an imaginary plane including the axis of the shaft 18 and radius 26 passing through the center of the holding portion 132. The planes 29 extend along the axis of the shaft 18. A distance between the planes 29 corresponds to 2R.

The rolling body 16 in the embodiment shown is a sphere having the radius R. The rolling body 16 is brought into rolling contact with the concave surface 22 of each holding portion 13a of the inside part 12 and is held in position by the concave surface 22. In order to dispose the rolling body 16 in the holding portion 13a to be held by the concave surface 22, the inside part 12 is conveniently formed of three members which will be later described. The rolling body 16 is formed to have a size to fit loosely to the concave surface 22 of the inside parts 12 and also to the two planes 29 of the outside parts 14.

Figure 3:
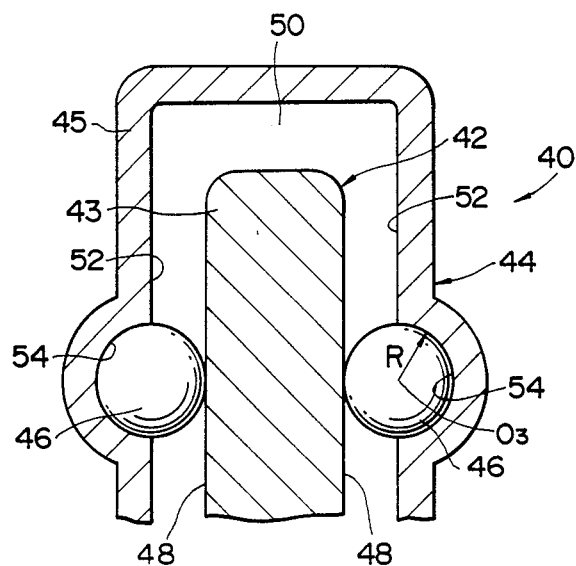
FIGS. 3 through 5 are sectional views similar to FIG. 1 but showing only portions of another embodiments of the universal joint, respectively.

A universal joint 40 in the embodiment in FIG. 3 comprises an inside part 42, an outside part 44 and two rolling bodies 46 disposed in each recess.

The inside part 42 is provided with three holding portions 43 (only one is shown in the drawing) disposed spacedly apart circumferentially at equal intervals and extending radially, while the holding portion 43 is not provided with any concave surface. Both side surfaces 48 of the holding portion 43 are parallel to an imaginary plane including an axis of a shaft and a radius passing through the center of the holding portion 43. Radial and axial lengths of the holding portion 43 of the inside part 42 are defined such that the rolling bodies 46 do not get out of place from the holding portion when the universal joint is rotated with a maximum joint angle.

The outside part 44 surrounding the inside part 42 is provided with three holding portions 45 arranged spacedly apart circumferentially at equal intervals and having respective recesses 50 extending axially to receive the respective holding portions 43 of the inside part 42. Two inner surfaces 52 of the holding portion 45 of the outside part 44 opposed to the holding portion 43 of the inside part 42 have respective concave surfaces 54 which ar concave hemispherical surfaces having the radius R centering around the center $O_3$ on an inner surface 52. The center $O_3$ of the concave hemispherical surface is not necessarily located on the inner surface 52 and it may be selectively located on any suitable position as much as it holds the rolling body, for example inward from the inner surface 52.

Each of two rolling bodies 46 is a ball having the radius R and the two rolling bodies 46 are disposed in each recess 50 as arranged at respective sides of the holding portion 43 of the inside part 42 one by one. The rolling body 46 is held in position by the concave surface 54 of the holding portion 45 of the outside part 44 to be in contact with the plane 48 of the holding portion 43 of the inside parts 42. The rolling body under this condition is sized to provide a loose fit.

The other structures of the embodiment shown in FIG. 3 are the same as those of the embodiment shown in FIGS. 1 and 2.

Figure 4:
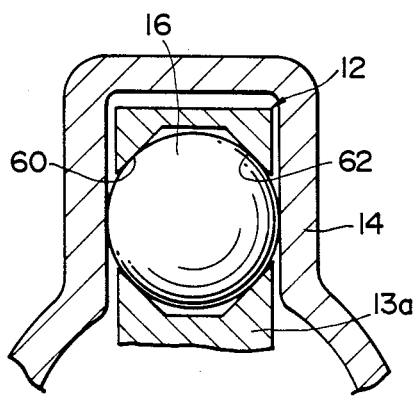

In the embodiment shown in FIG. 4, the concave surface provided in the holding portion 13a of the inside part 12 is constituted from two concave conical surfaces 60, 62. On the other hand, the rolling body 16 is a ball. As a result, the rolling body 16 will come into linear contact with the two concave conical surfaces 60, 62 in the circumferential direction.

The other structures of this embodiment are the same as those of the embodiment shown in FIGS. 1 and 2.

As shown in FIG. 4, when the concave surface contacting the rolling body 16 consists of two concave conical surfaces, the manufacture of the concave surface is facilitated. When the concave surface corresponds to a concave spherical surface and further the rolling body is a ball, the surface pressure is advantageously reduced in consideration of the original function of the universal joint for transmitting the rotary torque, whereas precision in the manufacture of the concave spherical surface is required to complicate the manufacture. However, when the concave surface corresponds to the concave conical surface, it is advantageous in manufacture.

Figure 5:
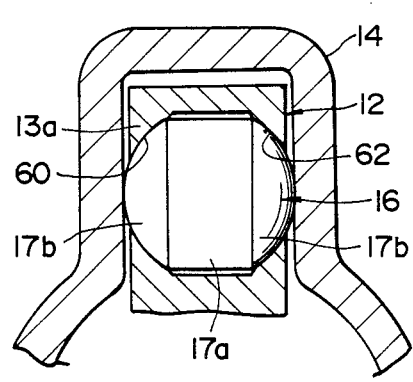

In the embodiment shown in FIG. 5, the concave surface of the holding portion 13a of the inside part 12 consists of two concave conical surfaces 60, 62 and the rolling body 16 has a circular profile surface 17a having a uniform diameter on the equater portion of a ball and the remaining portion formed into a spherical surface 17b.

In the case shown in FIGS. 4 and 5, the rolling body is held by the concave surface of the holding portion of the inside part. The configuration shown in FIGS. 4 and 5 may be applied even if the rolling body is held by the concave surface of the holding portion of the outside part as shown in FIG. 3.

In the embodiment as noted above, the concave surface corresponds to a concave spherical surface or concave conical surface, however it may be alternatively formed into concave elliptical, parabolic or polygonal surfaces. Further, instead of the concave semispherical surface in the embodiment shown in FIG. 2, a concave semi-conical, semi-elliptical, semi-parabolic or semi-polygonal polygonal surface may be used. The concave elliptical and parabolic surfaces make partial surface contact with the rolling body rather than the total surface contact therewith while the concave polygonal surface makes point contact with the rolling body. The surface pressure of the complete surface contact of the concave spherical surface with the ball is less than that of the partial surface contact, which is less than that of the linear contact, which is less than that of the point contact. However, the complete surface contact is the most difficult in working sand the working becomes easier in the order of partial surface contact, linear contact and point contact. Then, according to the amount of rotary torque to be transmitted, the type of concave surface can be determined.

Figure 6:
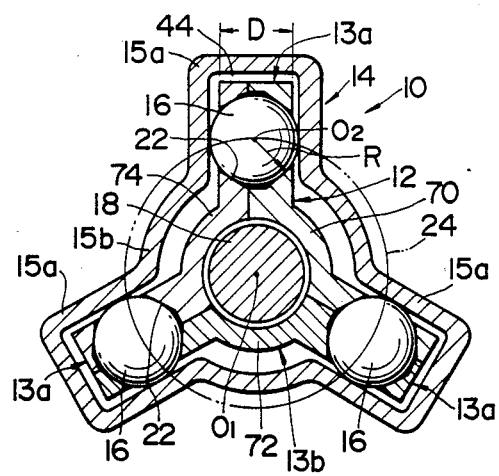
FIG. 6 is a sectional view taken along a plane orthogonal to an axis of a further embodiment of the universal joint.

The concave surfaces 22 of the holding portion of the inside part 12 shown in FIG. 6 correspond to concave conical surfaces formed to be point symmetrical with respect to intersection points $O_2$ of a circle 24 centering around the axis $O_1$ of the shaft 18 and drawn on an imaginary plane orthogonal to the axis and radii 26 extending from the axis $O_1$ to the center in the direction of thickness of respective holding portions 13a. The intersection point $O_2$ is referred to as a geometrical center. The rolling body 16 is disposed such that the center thereof is aligned with the geometrical center.

The inside part 12 consists of three members 70, 72 and 74 arranged circumferentially. These members are preferably formed into the same configuration. Each member has a holding piece at each of the circumferential ends. The holding piece is fixed to a holding piece of an adjacent member to constitute the first holding portion 13a.

Figure 7:
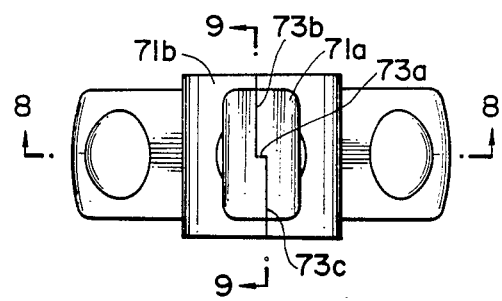
FIG. 7 is a plan view showing an inside part.
Figure 8:
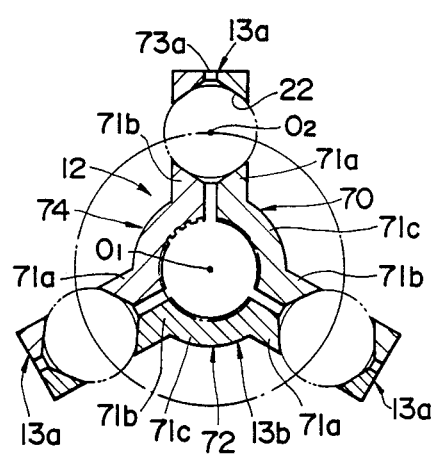
FIG. 8 is a sectional view taken along the line 8—8 in FIG. 7.
Figure 9:
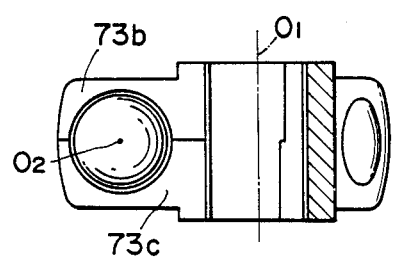
FIG. 9 is a sectional view taken along the line 9—9 in FIG. 7.

In the embodiment shown in FIGS. 7 through 9, three members 70, 72 and 74 have the same configuration and each of the three members includes a holding piece 71a at one circumferential end and another holding piece 71b at the other end, both holding pieces being formed integrally with each other through arcuate drums 71c. Each holding piece has a first joint surface 73a passing through the geometrical center $O_2$ and extending orthogonal to the axis $O_1$ of the shaft 18 and second and third joint surfaces 73b, 73c extending respectively orthogonal to the first joint surface 73a and parallel to an imaginary plane including the geometrical center $O_2$ and the axis $O_1$. In such a configuration as shown in FIG. 7, when both holding pieces 71a, 71b are in contact with each other, a step is produced in the joint portion, so that relative positioning of the adjacent members is facilitated.

Figure 10:
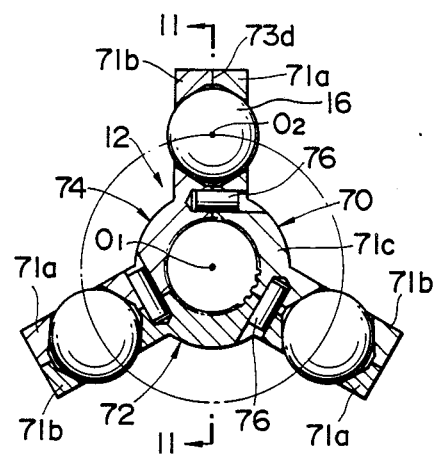
FIG. 10 is a sectional view similar to FIG. 8 but showing a further embodiment of the inside part.
Figure 11:
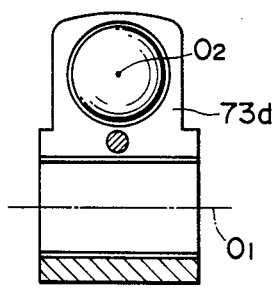
FIG. 11 is a sectional view taken along the line 11—11 in FIG. 10.

In the embodiment shown in FIGS. 10 and 11, three members 70, 72 and 74 constituting the inside parts 12 have the same configuration. The holding piece 71a at one circumferential end and holding piece 71b at the other circumferential end are arranged to be integral with each other by the drum 71c. The respective holding pieces include joint surfaces 73d including the geometrical center $O_2$ and the axis $O_1$.

Figure 12:
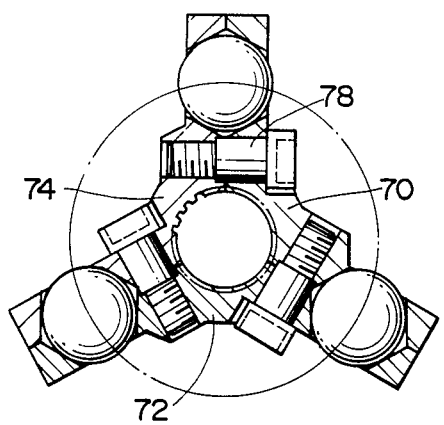
FIG. 12 is a sectional view similar to FIG. 8, but showing a still further embodiment of the inside parts.

The adjacent members 70,72 and 74 are coupled with each other by a pin 76 shown in FIG. 10 or a hexagonal socket head bolt 78 shown in FIG. 12 with the rolling body 16 being interposed and sandwiched between the holding piece of one member and another holding piece of the adjacent member. The adjacent members may be coupled with each other on outer peripheral surfaces by means of electronic beam or laser beam welding.

The boss 13b is formed by drums of the members 70,72 and 74 and positions of drums except for the connection of the adjacent drums are provided with an inside spline, while the shaft 18 having a spline on an outer peripheral surface is fitted into the boss 13b.

Each holding portion 13a of the inside part 12 is inserted into the recess 28 of the holding portion 15a of the outside part 14, grease is enclosed in the outside part 14 and the opening of the outside part 14 is covered with a boot to render the universal joint to be in a usable condition. The shaft 18 is coupled with a drive side for example while the shaft 30 is coupled with a driven side.

The rotary torque transmitted from the shaft 18 is taken out by the shaft 30 through the holding portions 13a of the inside parts 12, concave surfaces 22, rolling bodies 16 and holding portions 15a of the outside part 14 in the mentioned order.

When the universal joint 10 is rotated with the joint angle, the rolling body 16 moves axially in the recess 28 of the outside part 14 while moving radially relative to the outside parts 14. Since these movements are effected through rolling of the rolling body 16, the frictional resistance is small.

What is claimed is:

1. A slidable constant velocity joint comprising:
   an inside part provided integrally with a first shaft and having three first holding portions disposed spacedly apart circumferentially at equal intervals and extending radially and axially from the first shaft;
   an outside part provided integrally with a second shaft and having three second holding portions disposed spacedly apart circumferentially at equal intervals, each second holding portion having a recess extending axially of the second shaft to receive said first holding portion; and
   a rolling body disposed in said each recess so as to be in contact with the first holding portion of said inside part and the second holding portion of said outside part;
   wherein said each first holding portion includes a concave surface being in contact with and holding in position said rolling body while said each second holding portion includes two planes being in contact with said rolling body and being parallel to an imaginary plane which includes an axis of the first shaft and a radius extending from said axis and passing through a center of said first holding portion which is received in said second holding portion in a direction orthogonal to said axis.

2. A slidable constant velocity joint as claimed in claim 1, wherein each of said first holding portions has a substantial rectangular parallelopiped and is formed to have an axial length of the first shaft larger than a thickness in a direction orthogonal to the axis, the length being set to be larger than a diameter of the rolling body and the thickness being set to be smaller than the diameter of the rolling body.

3. A slidable constant velocity joint as claimed in claim 1, wherein said concave surface is formed to be point symmetrical with respect to an intersection point of a circle centering around an axis of the first shaft and drawn on an imaginary plane orthogonal to the axis and radius extending from the axis to the center in a direction of thickness of the first holding portion.

4. A slidable constant velocity joint comprising:
   an inside part coupled integrally with a first shaft and having three first holding portions disposed spacedly apart circumferentially at equal intervals and extending radially and axially of the first shaft, each holding portion having a concave surface, and said inside part consisting of three members arranged circumferentially each of which has holding pieces at circumferential ends thereof, each of the holding pieces being secured fixedly to another holding piece of an adjacent member to constitute said first holding portion;
   an outside part provided integrally with a second shaft and having three second holding portions disposed spacedly apart circumferentially at equal intervals, each second holding portion having a recess extending axially of the second shaft to receive said first holding portion and including two planes which are parallel to an imaginary plane which includes an axis of the first shaft and a radius extending from said axis and passing through a center of the first holding portion received in said second holding portion in a direction orthogonal to said axis; and
   a rolling body held in position by the concave surface of each of said first holding portions of said inside part so as to be in contact with the two parallel planes of each of said second holding portions of said outside part.

5. A slidable constant velocity joint as claimed in claim 4, wherein said three members of the inside parts have the same configuration.

6. A slidable constant velocity joint as claimed in claim 5, wherein each of said concave surfaces is formed to be point symmetrical with respect to an intersection point of a circle centering around an axis of the first shaft and drawn on an imaginary plane orthogonal to the axis of the first shaft and a radius extending from the axis of the first shaft through a center of the first holding portion in a direction of thickness thereof, and wherein each holding piece of the three members has a first joint surface passing through the intersection point and extending orthogonal to the axis of the first shaft, a second joint surface orthogonal to the first joint surface and a third joint surface extending parallel to an imaginary plane including the intersection point and the axis of the first shaft.

7. A slidable constant velocity joint as claimed in claim 5, wherein each of said concave surfaces is formed to be point symmetrical with respect to an intersection point of a circle centering around an axis of the first shaft and drawn on an imaginary plane orthogonal to the axis of the first shaft and a radius extending from the axis of the first shaft through a center of the first holding portion in a direction of thickness thereof, and wherein each holding piece of the three members has joint surfaces including the intersection point and the axis of the first shaft.

* * * * *